Nov. 19, 1957　　　M. E. STICKNEY　　　2,813,451
SPECTRAL SCANNING APPARATUS
Filed Dec. 6, 1951　　　　　　　　　　　　　　　2 Sheets-Sheet 1
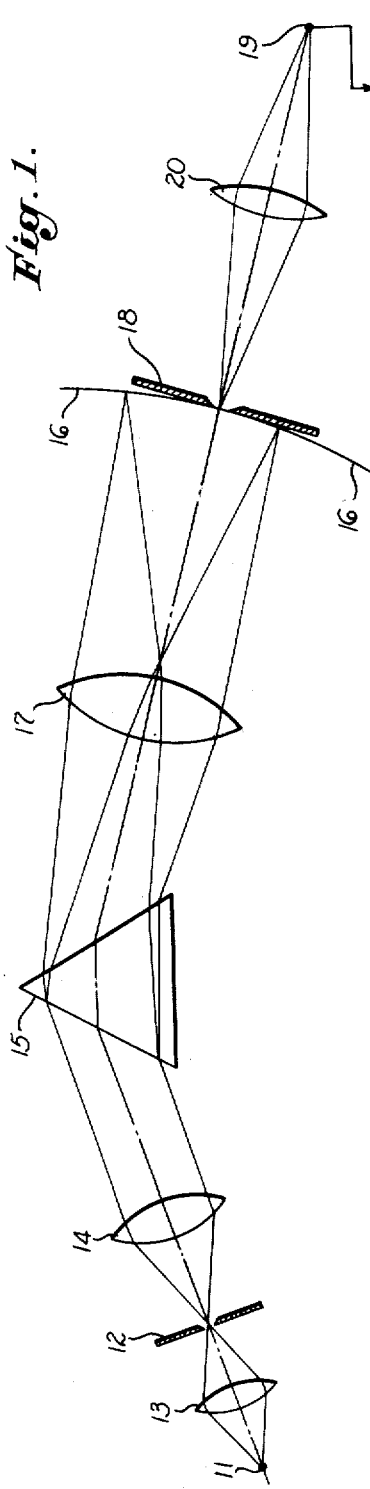
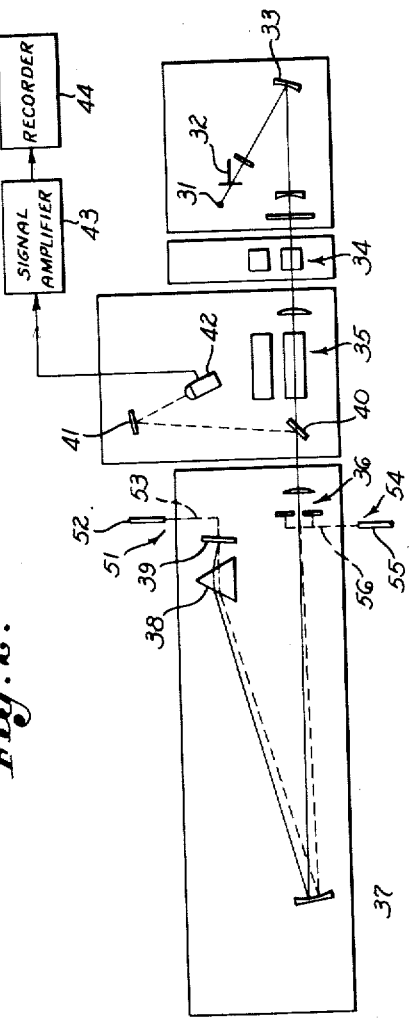
INVENTOR.
MICHAEL E. STICKNEY
BY HIS ATTORNEYS.
HARRIS, KIECH, FOSTER & HARRIS

United States Patent Office 2,813,451
Patented Nov. 19, 1957

2,813,451
SPECTRAL SCANNING APPARATUS

Michael E. Stickney, Alhambra, Calif., assignor to Beckman Instruments, Inc., South Pasadena, Calif., a corporation of California Application December 6, 1951, Serial No. 260,253

7 Claims. (Cl. 88—14)

The present invention relates to apparatus for scanning a spectrum, a primary object of the invention being to perform the scanning operation with maximum efficiency. Differently expressed, a primary object of the invention is to scan and record a spectral energy characteristic in a minimum of time without wasting available resolution.

More particularly, the present invention relates to spectrophotometry, a spectrophotometer being an instrument which includes a monochromator having means for producing a spectrum and for selecting therefrom a narrow band of radiation, and a system for measuring radiant energy. In a recording spectrophotometer, it is necessary to scan the spectrum and to record the energy transmitted to the energy-measuring system as successive bands of the spectrum are scanned. In order to scan the spectrum, it is necessary to produce relative movement between the spectrum and the exit slit through which each band of radiation passes on its way to the energy-measuring system, the latter including a detector responsive to the radiation transmitted by the exit slit and including a recorder for recording the intensity thereof. As is well known in the art, the energy-measuring system of a recording spectrophotometer requires a period of time to respond substantially fully to changes in level of energy of the radiation incident on the detector, this period of time being known as the response time of the energy-measuring system.

Consistent with the foregoing primary object of the invention, an object is to scan successive bands of the spectrum, each of a spectral band width corresponding to the prevailing geometric or physical slit width, for an interval of time proportional to the response time of the energy-measuring system.

Another object is to scan a spectrum through a slit by producing continuous displacement of slit and spectrum relative to each other at a rate maintained continuously proportional to the ratio of the prevailing geometric or physical width of the slot to the response time of the energy-measuring system.

A further object is to scan a spectrum through a slit by producing continuous relative displacement of the slit and the spectrum at a rate continuously proportional to the geometric width of the slit in an apparatus where the response period of the recording system is constant during the run.

Another object is to scan a spectrum through a slit by producing intermittent relative displacement of the slit and the spectrum by increments continuously maintained proportional to the prevailing geometric width of the slit. A related object is to maintain the slit and the spectrum stationary relative to each other after each relative displacement thereof so as to provide a dwell period permitting the recording system to respond.

Thus, whether the spectrum is scanned continuously, or in a step-by-step manner, the present invention provides maximum efficiency by scanning the spectrum at a variable but continuously optimum rate, this being continuously the maximum consistent with full use of available resolution under the selected conditions of operation. Thus, the present invention utilizes both time and available resolution to the maximum possible effectiveness, which is an extremely important feature.

The foregoing objects and advantages of the present invention, together with various other objects and advantages thereof which will become apparent, may be attained with the exemplary embodiments of the invention illustrated in the accompanying drawings and described in detail hereinafter. Referring to the drawings:

Fig. 1 is a simplified diagrammatic view of a recording spectrophotometer to which the present invention may be applied;

Fig. 2 is a more detailed diagrammatic view of a recording spectrophotometer to which the invention may be applied;

Figure 3:
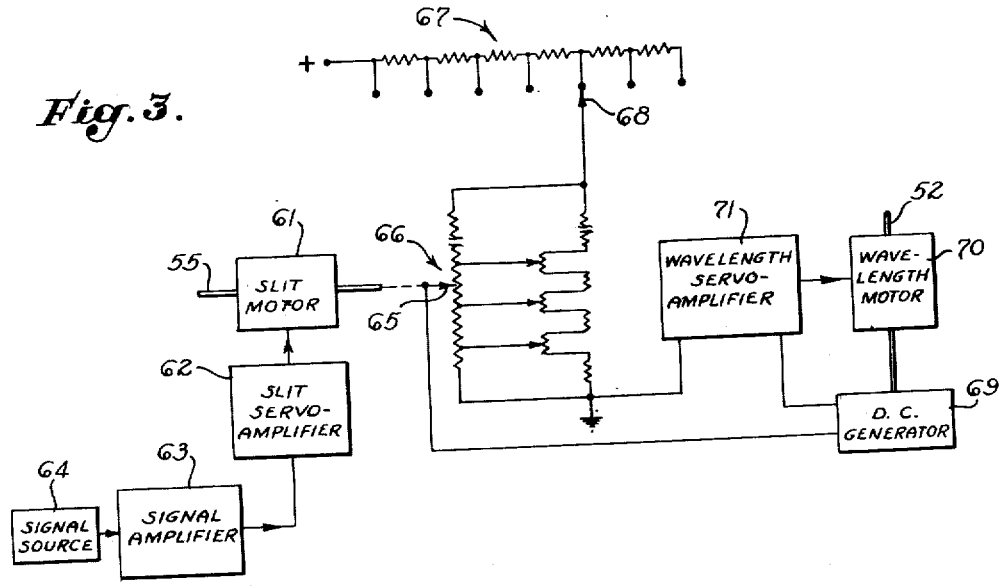
Fig. 3 is a diagrammatic view of an embodiment of an apparatus of the invention for use with a continuously recording spectrophotometer.

Referring first to Fig. 1 of the drawings, illustrated therein in highly schematic form is a recording spectrophotometer which may operate either continuously, or in a step-by-step manner. The spectrophotometer includes a radiation source 11, which may produce radiation in any wavelength range of interest, e. g., the visible range, the infrared range, the ultraviolet range, etc. Radiation emanating from the source 11 is focused on an entrance slit 12 by an imaging element, exemplified by a lens 13. Diverging radiation from the entrance slit is rendered parallel by a collimating element exemplified by a lens 14. The collimated radiation is dispersed by a dispersing means which is illustrated as a prism 15, the dispersed radiation being brought to a focus by an imaging element, shown as a lens 17, to form a spectrum lying in a focal surface 16. Radiation of useful purity is selected from the spectrum by means of an exit slit 18 adjacent the focal surface 16, a narrow band of radiation representing a small wavelength interval passing through the exit slit. The radiation passed by the exit slit 18 is focused on a radiation sensitive device or detector 19 by an imaging element exemplified by a lens 20, the radiation detector 19 being a thermocouple, for example. The signal generated by the radiation detector 19 is delivered to a signal amplifier 21 which, in turn, delivers an amplified signal to a recorder 22, which may be of any suitable type, such as a chart recorder, wire recorder, or the like. The radiation detector 19, the signal amplifier 21 and the recorder 22 are regarded hereinafter as forming the complete energy-measuring system of the spectrophotometer, this energy-measuring system requiring an interval of time to react essentially completely to a change in the intensity of radiation incident on the radiation detector. As hereinbefore explained, this interval of time is known as the response time of the recording system.

While the monochromator section of the spectrophotometer of Fig. 1 has been illustrated as including lenses and a prism, it will be understood that in practice mirrors may replace the lenses, a diffraction grating may replace the prism and the arrangement and number of the basic elements may vary. Also, various functions may be combined in a single element, such as a Fery prism. In any event, regardless of the number and nature of the monochromator elements, the monochromator produces a spectrum along the focal surface 16 as hereinbefore discussed. As is well known in the art, the distribution of wavelengths along the focal surface 16 may be far from uniform, although it is continuous. The wavelength distribution along the focal surface 16, i. e., the spectral spacing in terms of units of length per unit change of wavelength along the focal surface, commonly known as dispersion, depends primarily on the type of dispersing means employed and on the prism material if a prism is employed as the dispersing means.

As previously suggested, in a recording spectrophotometer such as that diagrammatically shown in Fig. 1, it is necessary to scan the spectrum so that the energy from successive portions of the spectrum may impinge on the detector 19 to permit the production by the recorder 22 of a record of transmitted radiant energy as a function of wavelength. The spectrum may be scanned in various ways. For example, the spectrum itself may be displaced along the focal surface 16 relative to the exit slit 18 by displacing some element of the optical system, such as the dispersing means, an auxiliary mirror, not shown in Fig. 1, or the like. Alternatively, the exit slit 18 may be displaced relative to the spectrum, which remains stationary. In Fig. 2 of the drawings is illustrated in more detailed form an exemplary recording spectrophotometer which scans the spectrum by rotating an auxiliary mirror, as will be discussed in the following paragraphs.

Referring to Fig. 2 of the drawings, the recording spectrophotometer illustrated therein includes a radiation source 31, the radiation beam from this source being interrupted at a low frequency, such as ten times per second, for example, by a rotating shutter 32. The resulting intermittent beam is transferred by various optical elements, including a condensing mirror 33, through a liquid-cell region 34 and a gas-cell region 35. Cells in these regions are used to enclose the substance undergoing examination, the region selected depending upon the physical form of the substance. The radiation is focused to form an image of the source 31 upon an upper, entrance slit defined by a slit-forming means 36, and is collimated by a spherical mirror 37, which directs the beam toward a prism 38. The latter disperses the radiation and the dispersed radiation is directed back through the prism 38 by a mirror 39. The radiation is further dispersed by a second passage through the prism 38 and is focused by the mirror 37 in the form of a spectrum at the plane of an exit slit defined by the slit-forming means 36 and disposed immediately below the entrance slit. The exit slit permits a narrow band of the spectrum to pass through and this portion of the beam impinges on a plane mirror 40, which directs the beam of selected radiation toward a condensing mirror 41. The latter focuses the beam of selected radiation upon a radiation detector 42, which serves as an output-signal generating means and which may be a thermocouple, for example. The output signal generated by the radiation detector 42 is delivered to a signal amplifier 43 and the resulting amplified signal is delivered to a recorder 44 for recording the intensity of the beam of selected radiation incident on the radiation detector 42.

In the recording spectrophotometer illustrated diagrammaticalmly in Fig. 2 of the drawings, the mirror 39 is rotatable so as to produce displacement of the spectrum relative to the exit slit, whereby the exit slit scans the spectrum. In other words, successive narrow wavelength bands of the spectrum are caused to register with the exit slit as the mirror 39 is rotated. For the purpose of rotating the mirror 39, a wavelength drive 51 is provided, the wavelength drive being represented by a wavelength shaft 52 operatively connected to the mirror 39, as indicated by the broken line connection 53.

It is frequently highly desirable to scan a wavelength region of the spectrum with a varying geometric slit width. In the so-called "double-beam" recording spectrophotometer it is essential for good performance of the beam-balancing servomechanism that detector response signal be maintained essentially constant in the spectral region scanned. Varying the slit width provides a convenient means of compensating for the changes of energy which otherwise would result from the nonuniform spectral characteristic of the source, and the nonuniform dispersion of such dispersing means as a prism. In the single-beam recording spectrophotometer, if used for emission studies, slit variation can provide compensation for nonuniform dispersion. When used in absorption work, slit variation can provide a constant energy reference level, against which the sample transmittancy may be measured, if a prior "standardization" operation or "run" is made, which sets up the program of slit variation subsequently to be followed in the sample run. The latter type of operation is more fully discussed in co-pending application, Serial No. 168,308, filed June 15, 1950, Patent No. 2,698,410, issued December 28, 1954, by Royal Glen Madsen, Roland C. Hawes and myself, the present application being a continuation-in-part of said co-pending application. Another use to which slit variation can be put is to provide constant resolution in terms of spectral bandwidth.

In addition to variation in geometric slit width, it is often highly desirable to vary scanning rate, for example by varying the rate of rotation of a prism or Littrow mirror, or rate of displacement of an exit slit, as the case may be. Optimum variation of scanning rate is in turn a function, among other factors, of slit-width variation. If a considerable spectral interval is scanned at constant speed, either time is wasted, since the wavelength drive lingers excessively in the region of relatively low realizable resolution, or available resolution is lost as the wavelength drive rate, adjusted for regions of low available resolution, scans the region of potentially high resolution at excessive speed.

The optimum manner of continuously relating the scanning speed to slit width, i. e., obtaining optimum efficiency or full realization of resolution in minimum time, is to examine each spectral slit width for an interval of time proportional to the response time of the energy-measuring system. According to the present invention, when applied to a continuously recording spectrophotometer, this condition is achieved in a novel, direct manner, with maximum economy of instrumental means, by making the scanning rate continuously proportional to the geometric slit width and inversely proportional to the response time of the energy-measuring system. Expressed differently, the present invention, applied to the continuously recording spectrophotometer, specifies a scanning rate continuously proportional to the ratio of geometric slit width to response time of the energy-measuring system. The terms "geometric slit width" and "spectral band width," as used in this specification, are hereinafter defined and distinguished from each other.

On the other hand, in an intermittent recording spectrophotometer the present invention achieves the desired scanning condition by specifying relative displacement of the spectrum and the exit slit by increments always proportional to the prevailing geometric width of the slit, with dwell times sufficient to permit the energy-measuring system fully to respond.

The manner of controlling the geometric slit width, taken by itself, forms no part of the present invention and will not be considered in detail herein. Suffice it to say that the recording spectrophotometer illustrated in Fig. 2 is provided with a slit drive 54 which is illustrated as including a slit shaft 55 operatively connected to the slit-forming means 36, as designated by the broken line connection 56.

The invention will be considered first in connection with continuous recording as a matter of convenience. Referring to Fig. 3 of the drawings, the slit shaft 55 is shown as connected to a servomotor 61 which is powered by a servoamplifier 62. Connected to the servoamplifier 62 is a signal amplifier 63 which amplifies a signal derived from a signal source 64. As indicated above, the signal source 64 may be any desired means for controlling the geometric widths of the entrance and exit slits.

The slit motor 61 also has connected thereto the movable contact 65 of a potentiometer 66. The total voltage drop across the potentiometer 66 is adjustable by varying the positioning of a contact 68 on the potentiometer 67. The potentiometer 66, furthermore, preadjusted by means of a parallel network of resistors, has a nonlinear voltage function such that the movable contact 65 controlled by the slit motor 61 is always at a potential with respect to ground which is proportional to geometric slit width. The function of the potentiometer 67 is discussed hereinafter.

The voltage sensed by the movable contact 65 of the potentiometer 66 is connected in series opposition to the output of a D. C. generator 69, the difference signal being applied to a wavelength servoamplifier 71. The latter energizes a wavelength motor 70, which is caused to drive the D. C. generator 69 always at a speed to make its output voltage essentially equal to that sensed by the contact 66. The wavelength motor 70 also advances the wavelength mechanism of the monochromator. Thus, the servomechanism drives the wavelength shaft 52 linearly with geometric slit width, i. e., at a rate proportional to geometric slit width. As a result, the spectrum is continuously displaced relative to the exit slit at a rate proportional to the geometric width of the slit, which is an important feature of the invention.

As is well known in the art, a recording spectrophotometer may be provided with an adjustable response period. This provides a means of effectively filtering out noise components of relatively high frequency, associated with the signal, which may otherwise appear in the record. As indicated earlier, maximum permissible scanning speed is a function of response time, the required time spent in examining each spectral slit width being proportional to said time, or expressed differently, the rate of scanning successive spectral slit widths is optimally inversely proportional to response time.

While the "velocity servo" comprising the wavelength servoamplifier 71, the wavelength motor 70, and the D. C. generator 69 maintains the necessary condition of instantaneous velocity proportional to instantaneous geometric slit width, it is the function of the potentiometer 67 to vary the "proportionality factor." The potentiometer 67 thus provides for varying the actual number of spectral slit widths traversed in any given time interval, or governs total allowed scanning time for a spectral region to be traversed. The potentiometer 67 thus also allows the scanning rate to be optimally adjusted inversely to the preset response time of the energy-measuring system.

In the particular construction illustrated wherein the left end of the potentiometer is shown as connected to a source of positive potential, the adjustable contact 68 is moved toward the right to adjust scanning speed for longer response time settings of the energy-measuring system. Considering the case where the adjustable contact 68 is positioned near the left end of the potentiometer 67, it will be apparent that a relatively high positive potential is applied to the upper end of the potentiometer 66 so that, for any given position of the movable contact 65, the wavelength motor 70 rotates the wavelength shaft 52 at a relatively high rate. Conversely, when the adjustable contact 68 is positioned near the right end of the potentiometer 67, a relatively low positive potential is applied to the upper end of the potentiometer 66 so that the wavelength motor 70 drives the wavelength shaft 52 at a relatively low speed. Thus, since each position of the adjustable contact 68 corresponds to a response time of the recording system, it will be apparent that the wavelength motor 70 drives the wavelength shaft 52 at a rate which is inversely proportional to the response period of the recording system. If desired, the potentiometer 67 may be calibrated in units of scanning rate, such as seconds per spectral band width, with the numerical values increasing from left to right, this being a unique convenience not possible with any of the scanning methods known to the prior art.

Thus, it will be seen that with the circuit illustrated in Fig. 3, the rate of rotation of the wavelength shaft 52 is always directly proportional to the geometric slit width and is adjustable to be inversely proportional to the response time of the recording system. In other words, the spectrum may be displaced relative to the exit slit at a rate which is proportional to the ratio of geometric slit width to response time, which is an important feature of the invention. During any particular run, the response time will normally be constant so that the apparatus illustrated in Fig. 3 produces displacement of the spectrum relative to the exit slit at a rate continuously proportional to prevailing geometric slit width. As hereinbefore discussed, this results in maximum operating efficiency since the spectrum is scanned in the smallest possible time consistent with effective utilization of available resolution.

Figure 4:
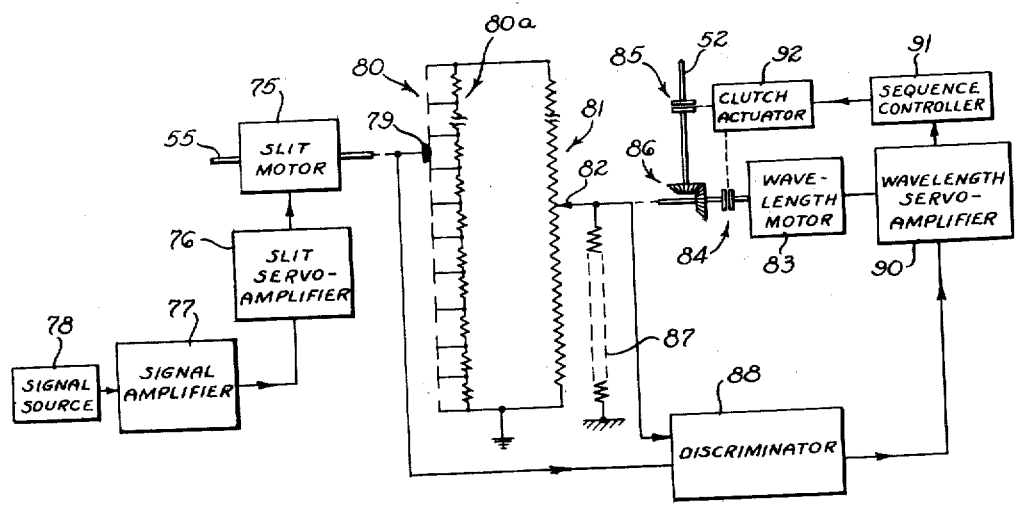
Fig. 4 is a diagrammatic view of an embodiment of an apparatus of the invention for use with a spectrophotometer which records in a step-by-step manner.

Referring to Fig. 4 of the drawings, illustrated therein is an apparatus for producing intermittent relative displacement of the exit slit and the spectrum by increments proportional to geometric slit width by intermittently rotating the wavelength shaft 52 through increments proportional to geometric slit width. As in the embodiment of Fig. 3, the slit shaft 55 is driven by a servomotor, identified by the numeral 75. The motor 75 is powered by a slit servoamplifier 76 which receives an amplified signal from a signal amplifier 77, the latter deriving a signal from any desired signal source 78. The slit motor 75 drives a movable contact 79 along a series of contacts 80 connected along a string of preadjusted resistors 80a. The latter structure is connected in parallel with a substantially linear potentiometer 81. Across resistor strings 80a and 81 is connected a source of potential, at the upper end and grounded at its other end. The component resistors of the string 80a are of such values that the movable contact 79 is always at a potential substantially proportional to physical or geometric slit width.

The movable contact 82 of the potentiometer 81 is connected to a wavelength servomotor 83 through a clutch 84. The wavelength shaft 52 is connected to the wavelength motor 83 through a clutch 85, and the clutch 84 via the intermediate mechanical member exemplified by gearing 86, which is mechanically linked to contact 82. It will be noted that this construction permits disconnecting the movable contact 82 from both the wavelength shaft 52 and the wavelength motor 83 by disengaging the two clutches 84 and 85. When the two clutches are disengaged, a spring 87 returns the movable contact 82 to the lower or negative end of the potentiometer 81.

The two movable contacts 79 and 82 are connected to a discriminator 88 producing a signal which is a function of the magnitude and sign of any difference in potential between the two contacts. The output signal from the discriminator 88 is delivered to a wavelength servoamplifier 90 which powers the wavelength motor 83. The wavelength servoamplifier 90 also governs, during the wavelength advancing operation, a sequence controller 91. The latter is a master switching unit which controls the timing of each step comprising the energy-measuring cycle at each wavelength position. Another step, besides wavelength advance, is the percent-transmission-recording step, and, in certain forms of spectrophotometers, there may be additionally zero adjustment, 100% adjustment, etc. In the wavelength advancing operation here under consideration, a signal from the servoamplifier, indicative of unbalance, causes the sequence controller 91 to engage clutches 84 and 85 via clutch actuator 92. When balance is attained, the output of the servoamplifier 90 is substantially zero and the sequence controller 91 causes the clutches 84 and 85 to disengage, and immediately shifts its control function to the next step in the automatic measuring cycle.

Considering the operation of the embodiment of Fig. 4, the slit motor 75 moves the contact 79 each time it changes geometric slit width so that the potential at the contact 79 is always substantially proportional to geometric slit width. It will now be assumed that the contact 79 is at some point intermediate the upper and lower ends of the potentiometer 80 and that the movable contact 82, which is driven by the wavelength motor 83 is at the lower end of the potentiometer 81. Under such conditions, it will be apparent that there will be a potential difference between the contacts 79 and 82, which potential difference results in an output signal from discriminator 88 applied to the wavelength servoamplifier 90. The amplified signal energizes the wavelength motor 83 to rotate the wavelength shaft 52 and to move the contact 82 upwardly, the clutches 84 and 85 being engaged at this stage. When the contact 82 has been moved upwardly to a point where it is exposed to the same potential as the potential applied to the contact 79, the output of the discriminator and servoamplifier fall to zero and the wavelength motor 83 stops. As hereinbefore indicated, the sequence controller 91 responds to this zero signal, or null condition between the contacts 79 and 82, to de-energize the clutch actuator 92, thereby allowing the spring 87 to return contact 82 to the ground position on the potentiometer 81. The sequence controller 91 at this time also switches the instrument to the next step in the measuring cycle.

Thus, it will be seen that this embodiment of the invention produces periodic rotational advancement of the wavelength shaft 52, always in one direction, by increments proportional to the geometric width of the slit since the angle through which the wavelength shaft 52 is rotated during each energization of the wavelength motor depends upon the voltage at contact 79, which is proportional to geometric slit width. Consequently, this embodiment produces intermittent displacement of the spectrum relative to the exit slit by increments proportional to geometric slit width, which is an important feature of the invention.

Although the number of steps in a measuring cycle may vary, dependent on the form of the spectrophotometer, one of the steps must be the percent-transmission, or transmitted-energy measuring step. In this step, the "dwell-time" at any wavelength position under examination can be determined by the time required for the energy-measuring (including energy-recording) system to achieve balance, i. e., by the response time of the energy-measuring system. In certain forms of spectrophotometers, the measuring cycle may consist of two steps only, a wavelength-advance step and a transmitted-energy measuring step. Under selected conditions of operation, wavelength advance time may be small compared to dwell time in the measuring step. Also, in some instruments requiring a greater number of steps, the total time for steps other than the transmitted-energy measuring step may be a small fraction of total expended time. Whenever the transmitted-energy measuring step is the predominant consumer of time, and dwell-time in this operation is caused to be proportional to response time of the energy-measuring system, it may be stated that the succession of spectral band widths is traversed at a rate substantially in inverse proportion to the response time of the measuring system.

In view of the foregoing, it will be seen that both in the embodiment of Fig. 3, wherein the spectrum is continuously displaced relative to the exit slit, and in Fig. 4, wherein the displacement is intermittent, the teaching of the present invention permits the scanning of a succession of spectral band widths, in a spectral region under examination, at a rate proportional to the ratio of geometric slit width to the response time of the measuring system.

It is possible, however, in the point-by-point recorder, to improve scanning efficiency even beyond that provided by dwell-time proportional to response time, and wavelength advance proportional to geometric slit width. Consider a system so designed that the slowest element in the energy-measuring and recording servomechanism, for example, a pen-drive mechanism, not shown, stays at the servo-determined position corresponding to the last-measured energy level unless and until a different level occurs at a subsequently examined wavelength position. In this case, if the system is designed to terminate dwell-time for the energy-measuring step when the recorder servo becomes balanced, e. g., when a controlling discriminator output becomes zero, then dwell-time can become vanishingly small, (assuming other response times in the measuring systems very small) whenever flat, or slowly changing portions of a spectral characteristic are being recorded. This is true because little or no further displacement of the slow recording element is required in these regions at each new wavelength position.

Those skilled in spectrophotometry are accustomed to thinking in terms of spectral band widths, i. e., in terms of wavelength intervals, instead of in terms of geometric or physical slit widths and, because of such thinking habits, it may not be immediately apparent to those skilled in this art how the present invention can operate on the basis of geometric slit width without taking dispersion into account in view of the fact that, depending on the position of the spectrum, spectral slit width varies with dispersion, as well as with slit jaw separation. The fact that dispersion need not be taken into consideration in connection with the present invention may be demonstrated mathematically, it being necessary first to define some of the terms to be used.

The first term to be defined is linear dispersion, $L\lambda$, which is a measure of the linear spread of wavelength along the focal surface 16 of Fig. 1 at any point thereon. Linear dispersion is given by the equation $$L\lambda = \Delta d / \Delta \lambda \qquad (1)$$

where $\Delta d$ is a small distance interval measured along the focal surface $\Delta \lambda$ is the wavelength change occurring in that distance interval. Linear dispersion varies from point to point along the focal surface 16.

The next term to be considered is angular dispersion, $D\lambda$, which is a measure of the angular spread of wavelength along the focal surface 16 at any point thereon, the angle being measured from the center of the focusing lens 17, or any other focusing element. Angular dispersion is given by the equation $$D\lambda = \Delta \phi / \Delta \lambda \qquad (2)$$

where $\Delta \phi$ is the angular interval corresponding to a small distance interval taken along the focal surface and where $\Delta \lambda$ is, as before, the wavelength change in that distance interval. Angular dispersion also varies from point to point along the focal surface and is equal to $L\lambda$ divided by the focal length of the lens 17, or other focusing element, such focal length being designated by the symbol $f$.

Geometric slit width, W, is the physical separation of the jaws defining the slit in question.

Another term to be defined is effective bandwidth, $\Delta\lambda B$, which is the wavelength interval, measured in any suitable units, corresponding to the geometric slit width, W, at the particular wavelength position in question. It also varies along the focal surface 16, being inversely proportional to linear dispersion, and being equal to $W/L\lambda$ when the lengths are expressed in the same units.

Another term to be defined is spectral band width, $\Delta\lambda_s$, which is a wavelength interval. When, as is conventional, the entrance and exit slits are of widths proportional to the focal lengths of the collimating and focusing elements, respectively, such as the collimating lens 14 and the focusing lens 17, the spectral band width is equal to twice the effective band width. The spectral band width defines the actual total range of wavelengths passed by the exit slit, as compared to the nominal wavelength interval in a band physically equal in width to the geometric slit width. The wavelength interval in a spectral band width and the wavelength interval in a band equal in width to geometric slit width are not identical because of the fact that the radiation at any point along the focal surface 16 is not pure, images of the entrance slit at successive wavelengths overlapping along the focal surface.

With the foregoing definitions in mind, a mathematical presentation will be made for continuous scanning as a matter of convenience, the continuous-scanning embodiment of the invention being the one illustrated in Fig. 3 of the drawings. In this mathematical presentation, it is necessary to determine how the rate $\phi$ of angular displacement of the moving element of the dispersing system, such as the rotatable mirror 39 of Fig. 2, must be varied in order to satisfy the condition that for every wavelength interval in a spectral region being scanned the traversal time $t_f - t_i$ (the difference between the final time $t_f$ and the initial time $t_i$) shall be proportional to the total number, $n$, of spectral band widths, $\Delta\lambda_s$, scanned, and shall be proportional to the response time, $R$, of the recording system irrespective of variations in the geometric slit width. As hereinbefore discussed, such variations may be necessary to maintain radiation intensity constant at some reference level, or the like. The conditions to be satisfied may be expressed in the equation $$t_f - t_i = aRn \tag{3}$$

This equation may be rewritten as $$n = (t_f - t_i)/aR \tag{4}$$

"$a$" being a constant in both Equations 3 and 4 above.

In any wavelength interval along the focal surface 16, the limits of which interval may be designated as $\lambda_i$ and $\lambda_f$, the number of spectral band widths traversed is given by the wavelength interval divided by the average spectral band width, $\overline{\Delta\lambda_s}$. Thus, $$n = (\lambda_f - \lambda_i)/\overline{\Delta\lambda_s} \tag{5}$$

However, the average spectral band width, $\overline{\Delta\lambda_s}$, is given by the equation $$\overline{\Delta\lambda_s} = \frac{\int_{\lambda_i}^{\lambda_f} \Delta\lambda_s \, d\lambda}{\lambda_f - \lambda_i} \tag{6}$$

Combining Equations 5 and 6, the result is $$n = \frac{(\lambda_f - \lambda_i)^2}{\int_{\lambda_i}^{\lambda_f} \Delta\lambda_s \, d\lambda} \tag{7}$$

Now, the actual linear geometric interval or distance interval corresponding to the spectral band width, $\Delta\lambda_s$, is $\Delta\lambda_s L\lambda$. Also, the corresponding angular displacement interval is $C\Delta\lambda_s L\lambda/f$, $C$ being a proportionality factor, which is ordinarily one or one half depending upon whether the rotating element includes a mirror or not. The corresponding time interval is $C\Delta\lambda_s L\lambda/f\phi$.

Now, transforming the limits of the integral from values of $\lambda$ to values of time and transforming the integrand of Equation 7 from a function of $\lambda$ to a function of time, $t$, the result is $$n = \frac{(t_f - t_i)^2}{\int_{t_i}^{t_f} \frac{C\Delta\lambda_s L\lambda}{f\phi} dt} \tag{8}$$

Equating Equations 4 and 8, the result is $$\int_{t_i}^{t_f} \frac{C\Delta\lambda_s L\lambda}{f\phi} dt = aR(t_f - t_i) \tag{9}$$

Simplifying Equation 9, the result is $$aR = \frac{C\Delta\lambda_s L\lambda}{f\phi} \tag{10}$$

Solving for $\phi$, and noting that $\Delta\lambda_s L\lambda$ is equal to twice the geometric slit width, $W$, the result is $$\phi = \frac{2CW}{afR} \tag{11}$$

Combining constants, we have $$\phi = \frac{KW}{R} \tag{12}$$

Thus, it will be seen that the required rate of angular displacement of the spectrum is directly proportional to the geometric slit width and is inversely proportional to the response period of the recording system, and is not a function of any other variable, such as dispersion. Thus, this demonstrates why the present invention may operate on the basis of geometric slit width, instead of spectral band width. This is an important feature since it permits obtaining the desired results with relatively simple apparatus.

It will be noted in connection with Equation 12 that if the response period is constant, which is ordinarily the case during a particular run, then the angular displacement rate is required to vary only with geometric slit width in accordance with the present invention, which is an important feature.

The foregoing mathematical presentation with respect to spectrum or slit displacement rate is equally applicable to prism rotation rates, or diffraction grating rotation rates, or rates of rotation of Littrow mirrors, in instruments where one or more such elements are rotated to displace the spectrum.

Although I have disclosed exemplary embodiments of the apparatus of the invention, it will be understood that such embodiments are illustrative only and that various changes, modifications and substitutions may be incorporated therein without necessarily departing from the spirit of the invention.

I claim as my invention:

1. In a spectrophotometer, the combination of: a monochromator providing means including optical elements for producing a spectrum in a focal surface and including relatively movable elements in said focal surface for defining a variable-width slit therein; wavelength drive means connected to at least one of said elements for producing relative displacement of said slit and the spectrum; slit drive means operatively connected to at least one of said slit-defining elements for varying the width of said slit; detecting and recording means including a detector responsive to radiant energy and positioned to receive radiant energy from the spectrum through said slit for detecting and recording the intensity of such radiant energy, said detecting and recording means requiring a period of time to respond to the level of radiant energy received; and control means connecting said wavelength drive means and said slit drive means and responsive to the geometric width of said slit for causing said wavelength drive means to relatively displace said slit and the spectrum continuously at a rate always proportional to the ratio of the prevailing geometric width of said slit to the response time of said detecting and recording means, said control means including a potentiometer having a movable contact connected to said slit drive means so as to be driven thereby.

2. In a spectrophotometer, the combination of: a monochromator providing means including optical elements for producing a spectrum in a focal surface and including relatively movable elements in said focal surface for defining a variable-width slit therein; wavelength drive means connected to at least one of said elements for producing relative displacement of said slit and the spectrum; slit drive means operatively connected to at least one of said slit-defining elements for varying the width of said slit; detecting and recording means including a detector responsive to radiant energy and positioned to receive radiation from the spectrum through said slit for detecting and recording the intensity of such radiation; and control means connecting said wavelength drive means and said slit drive means and responsive to the geometric width of said slit for causing said wavelength drive means to relatively displace said slit and the spectrum intermittently by increments proportional to the geometric width of said slit, said control means including means operatively connected to said wavelength drive means for maintaining the spectrum and said slit relatively stationary after each relative displacement thereof, said control means including a pair of potentiometers respectively provided with movable contacts respectively operatively connected to said slit drive means and said wavelength drive means so as to be driven thereby.

3. In a spectrophotometer, the combination of: monochromator means for forming a spectrum along a spectral locus; means defining a variable-width slit positioned on said spectral locus and admitting a relatively narrow band of wavelengths from said monochromator means to a radiation responsive device; wavelength varying means for progressively displacing said spectrum and said slit-defining means relatively to each other to scan said spectrum; a first prime mover for driving said wave-length varying means; a slit drive means powered by a second prime mover for varying the geometric width of said slit during the scanning of said spectrum; signal generating means coupled to said slit drive means for developing a control signal as a function of said slit width; and means responsive to said control signal and operative on said first prime mover for varying the rate of said progressive displacement as a function of said slit width, whereby said rate is increased or decreased in response to widening or narrowing of said slit, respectively.

4. In a spectrophotometer, the combination of: monochromator means for forming a spectrum along a spectral locus; means defining a variable-width slit positioned on said spectral locus and admitting a relatively narrow band of wavelengths from said monochromator means to a radiation responsive device; wavelength varying means for progressively displacing said spectrum and said slit-defining means relatively to each other to scan said spectrum; a first prime mover for driving said wavelength varying means; slot drive means powered by a second prime mover for varying the geometric width of said slit during the scanning of said spectrum; signal generating means coupled to said slit drive means for developing a control signal as a function of said slit width; and means responsive to said control signal and operative on said first prime mover for varying the rate of said progressive displacement as a function of said slit width, whereby in equal time intervals the amount of said progressive displacement is a function of the integral of the slit width taken over the time interval.

5. In a spectrophotometer, the combination of: monochromator means for forming a spectrum along a spectral locus; means defining a variable-width slit positioned on said spectral locus and admitting a relatively narrow band of wavelengths from said monochromator means to a radiation responsive device; wavelength varying means for continuously displacing said spectrum and said slit-defining means relatively to each other for scanning said spectrum; a variable-speed first prime mover for driving said wavelength varying means; slit drive means powered by a second prime mover for varying the geometric width of said slit during the scanning of said spectrum; signal generating means coupled to said slit drive means for developing a control signal as a function of said slit width; and means responsive to said control signal and operative on said first prime mover for continuously varying the speed thereof as a function of said slit width, whereby the rate of said continuous displacement is increased or decreased in response to widening or narrowing of said slit, respectively.

6. In a spectrophotometer, the combination of: monochromator means for forming a spectrum along a spectral locus; means defining a variable-width slit positioned on said spectral locus and admitting a relatively narrow band of wavelengths from said monochromator means to a radiation responsive device; wavelength varying means for continuously displacing said spectrum and said slit-defining means relative to each other for scanning said spectrum; a variable-speed first prime mover for driving said wavelength varying means; slit drive means powered by a second prime mover for varying the geometric width of said slit during the scanning of said spectrum; signal generating means coupled to said slit drive means for developing a control signal directly proportional to said slit width; and means responsive to said control signal and operative on said first prime mover for continuously varying the speed thereof directly proportional to said slit width, whereby the rate of said continuous displacement is increased or decreased in response to widening or narrowing of said slit, respectively.

7. In a spectrophotometer, the combination of: monochromator means for forming a spectrum along a spectral locus; a radiation sensing device; means providing a variable-width slit positioned on said spectral locus and admitting energy in a selected narrow range of wavelengths from said monochromator means to said sensing device; wavelength varying means, including a first prime mover, for progressively displacing said spectrum and the slit-defining means relative to each other to scan said spectrum; means for generating a slit-width control signal; slit-width varying means, including a second prime mover responsive to said slit-width control signal, for varying the geometric width of said slit during the scanning of said spectrum, whereby to control the energy admitted to said sensing device; signal generating means coupled to said slit-width varying means for developing a scanning control signal as a function of said slit width; and means responsive to said scanning control signal and operative on said first prime mover for varying the rate of said progressive displacement as a function of said slit width, whereby said rate is increased or decreased in response to widening or narrowing of said slit, respectively.

References Cited in the file of this patent

UNITED STATES PATENTS

| | | |
|---|---|---|
| 1,964,365 | Razek et al. | June 26, 1934 |
| 2,236,379 | Pineo | Mar. 25, 1941 |
| 2,411,741 | Michaelson | Nov. 26, 1946 |
| 2,462,946 | Coggeshall et al. | Mar. 1, 1949 |
| 2,499,322 | Mather et al. | Feb. 28, 1950 |
| 2,517,121 | Liston | Aug. 1, 1950 |
| 2,572,119 | Dieke | Oct. 23, 1951 |
| 2,587,451 | Farrand | Feb. 26, 1952 |
| 2,621,298 | Wild et al. | Dec. 9, 1952 |
| 2,654,287 | Luft | Oct. 6, 1953 |

UNITED STATES PATENT OFFICE
Certificate of Correction

Patent No. 2,813,451                                      November 19, 1957

Michael E. Stickney

It is hereby certified that error appears in the printed specification of the above numbered patent requiring correction and that the said Letters Patent should read as corrected below.

Column 1, line 53, for "the slot" read —the slit—; column 3, lines 57 and 58, for "diagrammaticalmly" read —diagrammatically—; column 7, line 74, for "poin-by-point" read —point-by-point—; column 8, line 61, for "$\Delta\lambda B$" read —$\Delta\lambda_B$—; column 11, line 20, for "relatively" read —relative—; line 41, for "slot" read —slit—.

Signed and sealed this 25th day of February 1958.

[SEAL]

Attest:
KARL H. AXLINE,
*Attesting Officer.*

ROBERT C. WATSON,
*Commissioner of Patents.*